US011498567B2

(12) United States Patent
Billich

(10) Patent No.: US 11,498,567 B2
(45) Date of Patent: Nov. 15, 2022

(54) METHOD FOR OPERATING A WORKING VEHICLE-WORKING DEVICE COMBINATION

(71) Applicant: DEERE & COMANY, Moline, IL (US)

(72) Inventor: Manuel Billich, Dischingen (DE)

(73) Assignee: DEERE & COMPANY, Moline, IL (US)

( * ) Notice: Subject to any disclaimer, the term of this patent is extended or adjusted under 35 U.S.C. 154(b) by 566 days.

(21) Appl. No.: 16/594,712

(22) Filed: Oct. 7, 2019

(65) Prior Publication Data

US 2020/0114919 A1   Apr. 16, 2020

(30) Foreign Application Priority Data

Oct. 11, 2018   (DE) .......................... 102018217426.1

(51) Int. Cl.
*B60W 30/188*   (2012.01)

(52) U.S. Cl.
CPC . *B60W 30/1888* (2013.01); *B60W 2510/0623* (2013.01); *B60W 2510/0638* (2013.01); (Continued)

(58) Field of Classification Search
CPC ......... B60W 2510/00; B60W 2510/30; B60W 2510/305; B60W 2510/083; B60W 2510/084; B60W 2510/623; B60W 2510/0638; B60W 2510/0657; B60W 2510/0676; B60W 2510/0661; B60W 30/00; B60W 30/1888; B60W 30/188; B60W 2710/10; B60W 2710/105; B60W 2710/1055; B60W 2710/1061; B60W 2710/1005; B60W 2710/0666; B60W 2710/0672; B60W 2520/00; B60W 2520/30; B60W 2520/40; B60W 2520/403; B60W 2530/00; B60W 2530/22; B60W 2510/10; B60W 2510/1005; B60W 2510/101; B60W 2510/08; B60W 2300/00; B60W 2300/12; B60W 2300/125; B60W 2300/126; B60W 2300/128; B60W 2300/14; B60W 2300/15; B60W 2300/152; B60W 2300/158; B60W 2510/06;
(Continued)

(56) References Cited

FOREIGN PATENT DOCUMENTS

EP   1889531 A1   2/2008

OTHER PUBLICATIONS

European Search Report issued in counterpart European Patent Application No. 19197289.2 dated Mar. 10, 2020 (10 pages).

*Primary Examiner* — Anthony R Jimenez

(57) ABSTRACT

A method for operating a working vehicle-working device combination having a part system for adjusting the working vehicle-working device combination includes determining a motor torque of a motor of the working vehicle-working device combination based on a motor parameter, determining a first loss torque based on at least one motor loss parameter of the motor, determining a second loss torque based on at least one load parameter of a load system of the working vehicle-working device combination, determining an output torque of the working vehicle-working device combination based on the motor torque and the first and second loss torques, and performing a control operation on the working vehicle-working device combination or on the part system based on the output torque.

2 Claims, 2 Drawing Sheets

(52) U.S. Cl.
CPC .............. *B60W 2510/0657* (2013.01); *B60W 2510/0676* (2013.01); *B60W 2510/305* (2013.01)

(58) Field of Classification Search
CPC .......... B60W 2510/38; G05D 2201/00; G05D 2201/02; G05D 2201/0201; A01D 41/00; A01D 41/04; A01D 17/00; A01D 19/00; A01D 19/12; B60K 17/00; B60K 17/36; B60L 2260/00; B60L 2260/20; B60L 2240/00; B60L 2240/10; B60L 2240/40; B60L 2240/423; B60L 2240/44; B60L 2240/443; B60L 2240/48; B60L 2240/485; B60L 2240/486; B60L 2200/40
USPC ........................................................ 701/50
See application file for complete search history.

METHOD FOR OPERATING A WORKING VEHICLE-WORKING DEVICE COMBINATION

RELATED APPLICATIONS

This application claims priority to German Patent Application Ser. No. 102018217426.1, filed Oct. 11, 2018, the disclosure of which is hereby incorporated by reference in its entirety.

FIELD OF THE DISCLOSURE

The present disclosure relates to a working vehicle-working device combination, a method of operating the same, and a system thereof.

BACKGROUND

Working vehicle-working device combinations are known, in particular as a working vehicle that is connected to a working device, in particular as a working vehicle having a coupled or attached working device.

The working vehicle may be used in order to pull or push the working device, in particular in the construction industry during construction work or in agriculture for field work. The working vehicle may be a towing machine or a construction machine, in particular an agricultural or a construction industry towing machine such as a tractor or the like. The working vehicle may be two-wheeled, three-wheeled or four-wheeled, or may have more wheels or may comprise a track. Furthermore, the working vehicle may comprise a two-wheel or four-wheel drive system. A working vehicle may comprise a driver cabin, a motor and a transmission. The working vehicle may drive a working device that is pulled on the ground or a working device that comes into engagement with the ground or soil or a working device that comes into engagement with objects that are on the ground or located therein.

The working vehicle-working device combination may also comprise a part system, in particular an actuating unit or a mounting device such as a three-point power lift or a hoist. The part system renders it possible to connect the working device to the working vehicle in a simple manner, in other words to arrange or to attach or to couple the working device in front of or to the rear of the working vehicle. In this case, the working vehicle and the working device form a functional unit, by way of example in that the coupling points on the working vehicle are brought into connection with the corresponding receiving arrangements of the working device. The part system of the working vehicle may also be used in order to adjust the working device relative to the working vehicle or to the ground such as in order to lift or lower the working device relative to the working vehicle or ground. The part system may be arranged or fastened on the working vehicle, i.e., it may be detachably connected. The term "working device" as it is used here includes without limitation practically any object that may be arranged on a working vehicle or that may be operated from this working vehicle. The working device may be a trailer, a roller or a cultivator.

The use of the working device places high demands upon the working vehicle-working device combination, in particular on the adjustment and the cooperation of the working vehicle with the working device. It is only possible to perform work using the working vehicle-working device combination in a rapid and efficient manner using a coordinated operation between the working vehicle and the working device. The coordinated operation of the working vehicle-working device combination, however, depends upon the adjustment of the towing force, in other words the force with which the working device engages with or pulls on the working vehicle. By way of example, in the absence of a towing force regulating procedure in the case of intensely inhomogeneous or particularly moist ground owing to a particularly large resistance force on the working device there is the possibility of the working vehicle coming to a standstill or the motor stalling.

For this reason, it is possible to provide a towing force regulating procedure that strives to prevent the motor stalling or to prevent a reduction of the slip of the drive wheels in that the towing force of the working device on the working vehicle is measured and the working vehicle-working device combination is adjusted. Known towing force regulating procedures function essentially as follows, initially the towing force is directly measured and a deviation from a predetermined reference towing force is determined. Subsequently, in the event of a deviation being present, a position of the working device with respect to the working vehicle or the ground is typically adjusted or the working vehicle is accelerated or braked. Consequently, a significant problem of the known working vehicle-working device combinations and methods for operating the working vehicle-working device combination is that these combinations and methods provide too few mechanisms for adjusting the working vehicle-working device combination, including the working vehicle, with the result that a precise and efficient towing force regulating procedure is not possible.

A further disadvantage is the use of the known force measuring pins (that includes an extensometer) for measuring the towing force of the working device on the working vehicle and for producing a signal that indicates the towing force. The accuracy of the signal that is produced by a force measuring pin of this type is dependent upon the type of the working device. Moreover, the known force measuring pins for measuring the towing force rapidly become soiled, which causes an erroneous towing force measurement. The force measuring pins also require too much installation space in the working vehicle-working device combination. Consequently, a further problem of the known towing force regulating procedures and the known systems for regulating the towing force of a working vehicle-working device combination may be that the towing force regulating procedures are not sufficiently reliable or are too imprecise or complex and therefore too cost-intensive in production and maintenance.

Based on this prior art, there is a need for a method for operating a working vehicle-working device combination, a system for a working vehicle-working device combination and a working vehicle-working device combination for improving the procedure for determining and adjusting the towing force.

SUMMARY

In the present disclosure, a method is proposed for operating a working vehicle-working device combination having a part system for adjusting the working vehicle-working device combination. The method may be a towing force regulating method for a working vehicle-working device combination, in particular for a working vehicle of the working vehicle-working device combination. The part system may be preferably for adjusting a working device of the working vehicle-working device combination. The method comprises the following steps:

determining a motor torque of a motor of the working vehicle-working device combination, in particular a motor of the working vehicle of the working vehicle-working device combination in dependence upon a motor parameter, and determining a first loss torque in dependence upon at least one motor loss parameter of the motor, or determining a second loss torque in dependence upon at least one load parameter of the at least one load system of the working vehicle-working device combination, in particular of the working vehicle, and determining an output torque of the working vehicle-working device combination, in particular of the working vehicle, with the aid of the motor torque and the first or second loss torque, and performing a control operation on the working vehicle-working device combination or on the part system in dependence upon the output torque, in particular on a value of the output torque.

Proportionality or relation between the output torque and the towing force is fundamental for the present disclosure.

$$M_T^{Aus} \sim F_Z$$

In this case, "an outgoing or outward torque on a transmission of the working vehicle-working device combination, in particular on the working vehicle," may be understood as the output torque. It is possible, owing to the proportionality of the output torque and the towing force, to therefore adjust the output torque and consequently the towing force by means of the control operation and in dependence upon the determined output torque. In this case, it is advantageously possible to omit measuring pins or similar measuring sensors for measuring the towing force. Furthermore, this measure renders it possible to precisely adjust the towing force in that the motor parameter or the motor loss parameter or load parameter are adjusted. The output torque and consequently the towing force may be adjusted with a greater accuracy and efficiency by virtue of the fact that the method renders it possible to adjust the towing force with the aid of multiple parameters.

The procedure of performing the control operation on the working vehicle-working device combination in this case may comprise adjusting the output torque in that it is possible to adjust the motor parameter, the motor loss parameter, load parameter, the motor torque or the first and second loss torque of the working vehicle-working device combination, in particular of the working vehicle. The control operation may likewise also comprise adjusting the part system or a mixture of adjusting the output torque and adjusting the part system. It is consequently advantageously possible to omit complex electronic systems, actuating systems and sensor systems for determining or adjusting the towing force. Furthermore, a significantly more precise adjusting procedure, in other words controlling procedure or regulating procedure, of the output torque and consequently the towing force is possible since it is possible to adjust each of the above-mentioned parameters or torques. There are consequently, in comparison to known methods, significantly more mechanisms available for adjusting the towing force. Moreover, the towing force may be more reliably and more precisely determined in a simple manner, and expensive and maintenance-intensive force measuring pins may be omitted.

The working vehicle-working device combination, in particular the working vehicle or the working device may comprise a control unit. The control unit may be embodied and configured in such a manner that the method may be implemented at least in part or entirely using the control unit. By way of example, it is possible for the control unit to determine, store, output or to adjust the motor parameter, the motor loss parameter, the load parameter, the motor torque, the first and second loss torque or the output torque. Changes to the mentioned parameters or torques may likewise be adjusted automatically. The term "adjustable" or "may be adjusted" in this case is to be understood in particular as controlling, regulating, changing, or maintaining an adjustment of the mentioned parameters, torques, the part system or the working vehicle-working device combination and its components (working vehicle/working device), by an adjusting device or an actuator.

The working vehicle-working device combination may comprise one or multiple sensors for producing or generating sensor signals. The sensor or sensors may determine the motor parameter, the motor loss parameter, or the load parameter may generate the sensor signal of the parameters. Moreover, the sensor signal may be determined using the control unit. The term "determine" may be understood as calculate or measure or detect or evaluate. Furthermore, the control unit may be an electronic module or an embedded system or may comprise a storage device or a processor. The control unit may be connected so that it may transmit signals to the part system, the one or multiple adjusting devices, actuators, the sensor, the motor, the load system or the working vehicle-working device combination, in other words to the working vehicle or to the working device so that the control unit may be connected in a data-conducting manner or the connection may be realized in a wired or wireless manner. The communication bus may be an Isobus, CAN bus or similar. Moreover, the part system, the adjusting device, the actuator, the sensor, the motor, the load system, the working vehicle-working device combination, the working vehicle, or the working device is adjustable or may be adjusted by the control unit.

The output torque $M_T^{Aus}$ may be a function of multiple torques, in particular of the motor torque $M_{Mot}$ and of one or multiple loss torques $M_{Vn}$, and also of a selected transmission ratio $i_T$, in other words of the prevailing transmission ratio of the working vehicle-working device combination, and of a transmission efficiency value $\eta_T$:

$$M_T^{Aus} = f(M_{Mot}, M_{V1}, M_{V2}, \ldots, M_{Vn}, i_T, \eta_T)$$

In particular, the output torque $M_T^{Aus}$ is a function of the motor torque $M_{Mot}$, of the first loss torque $M_{V1}$ and of the second loss torque $M_{V2}$:

$$M_T^{Aus} = f(M_{Mot}, M_{V1}, M_{V2}, i_T, \eta_T)$$

Consequently, the output torque may be determined in dependence upon a few parameters, which significantly simplifies the steps of determining and adjusting the towing force.

The motor torque $M_{Mot}$ may subsequently be a function of one or multiple motor parameters $b_{Motn}$:

$$M_{Mot} = f(b_{Mot1}, b_{Mot2}, \ldots, b_{Motn})$$

The first loss torque $M_{V1}$ may be a function of one or multiple motor loss parameters $X_{MOTn}$ of the motor:

$$M_{V1} = f(X_{MOT1}, X_{MOT2}, \ldots, X_{MOTn})$$

The second loss torque $M_{V2}$ may be a function of one or multiple load parameters $Y_{MOTn}$:

$$M_{V2} = f(Y_{MOT1}, Y_{MOT2}, \ldots, Y_{MOTn})$$

The motor parameter $b_{Mot}$ or the motor loss parameter $X_{Mot}$ or the load parameter $Y_{Mot}$ may be either one or multiple values or however itself may again be a function in dependence upon further variable values, in other words variables or parameters.

The working vehicle-working device combination may also comprise an inclination sensor for measuring an inclination of the working vehicle-working device combination or a communication module for receiving location information of the working vehicle-working device combination. The output torque may be determined in dependence upon a third loss torque, wherein the third loss torque may be determined in dependence upon the inclination or the location information with the result that the output torque or the towing force of the working vehicle-working device combination may in addition be adjusted in dependence upon the inclination or the location information.

The motor parameter may be determined directly or indirectly by a motor sensor, wherein the motor sensor may be arranged on or in the working vehicle-working device combination or the working vehicle or the motor. The motor loss parameter may be determined directly or indirectly by one or multiple motor loss sensors. The motor loss sensor may be arranged on or in the working vehicle-working device combination or the working vehicle or the motor. The load parameter may be determined directly or indirectly by one or multiple load sensors. The load sensor may be arranged on or in the working vehicle-working device combination, in particular on or in the working vehicle or the motor, in order to determine the load parameter. The motor parameter, the motor loss parameter, the load parameter, the motor torque, the first loss torque or the second loss torque may be available to the control unit, in particular in a storage device of the control unit as a calculated value, an indirectly measured value, a value table, or as a characteristic diagram (look up table). The motor torque or the first loss torque or the second loss torque may be determined using the respectively allocated parameters (motor parameter/motor loss parameter/load parameter) by a characteristic diagram, a value table, allocation table or may be calculated by means of the control unit.

The functions of the motor torque, the first or second loss torque, the motor parameter, the motor loss parameters, or the load parameters may be approximation functions that are determined by polynomial regression. The functions of the motor torque, the first or second loss torque, the motor parameter, the motor loss parameter, or the load parameter however may also be generated by a simulation method or by means of measurements on a prototype. The functions of the motor torque, the first or second loss torque, the motor parameter, the motor loss parameter, or the load parameter may be stored in the control unit or may be calculated by the control unit or may be available as a value table or characteristic diagram.

The load system may be arranged on the working vehicle-working device combination, on the working vehicle or may be embodied as a device of the working vehicle-working device combination, in particular of the working vehicle. The motor may drive the load system, by way of example the motor may drive an auxiliary drive by means of a belt drive. The load system may be a fan or a generator, e.g., an electric generator, or a pump, e.g., a cooling pump or a hydraulic pump. The load system may generate a second loss torque in dependence upon the load parameter and the second loss torque may also be additionally taken into account on the flywheel of the motor. If multiple load systems are provided, the second loss torque may be described as the sum of the torques of the load systems in dependence upon the respective load parameter.

One or more of the steps of the method above may be implemented in the disclosed sequence, or may be implemented at least in part in a chronologically overlapping manner, or may be implemented separately or repeated. The first three steps, for example, may be implemented simultaneously or in part in a chronologically overlapping manner. All of the steps of the method may be implemented when the working vehicle-working device combination is being driven. In particular, the method is initiated by the driver or is initiated automatically with a predetermined driving situation and then is intermittently or continuously implemented. The method may likewise be terminated by the driver or automatically during a driving situation that may be predetermined.

The method for operating the working vehicle-working device combination comprises the advantage that the procedure for determining the output torque and consequently the towing force may be performed without complex measuring technology and a procedure for adjusting the working vehicle-working device combination, in particular the working vehicle or the working device, or the part system may be realized in a reliable, precise and technically simple manner. Furthermore, a procedure for adjusting the output torque, in other words the towing force, is advantageously also rendered possible irrespective of the type of the working device. Since the procedure for determining the output torque is performed with the aid of parameters that are tailored to the operating conditions of the working vehicle-working device combination, the procedure for adjusting the output torque by means of changes to one of the parameters, changes to the motor torque, or the first or second loss torque advantageously renders it possible to tailor the operating point to the optimal output torque for the actual surrounding conditions.

In one embodiment of the present disclosure, the procedure for determining the output torque of the method may include the following steps. A transmission torque $M_T^{Ein}$ is determined, i.e., the torque that is supplied by the motor to a transmission of the working vehicle-working device combination, in that the first and second loss torque $M_{V1}$, $M_{V2}$ is subtracted from the motor torque $M_{Mot}$. In order to determine the output torque, the transmission torque $M_T^{Ein}$ is multiplied by a selected transmission ratio $i_T$, in other words the prevailing transmission ratio of the working vehicle-working device combination, and is divided by a transmission efficiency value $\eta_T$.

The output torque thus results as follows:

$$M_T^{Aus} = M_T^{Ein} \times \frac{i_T}{\eta_T}$$

with the transmission torque $$M_T^{Ein} = M_{Mot} - M_{V1} - M_{V2} - M_{PTO}^{Ein}$$

In particular, by way of example, if a PTO shaft is additionally used, a torque of the PTO shaft may also be incorporated into the transmission torque as a third loss torque $M_{PTO}^{Ein}$:

$$M_T^{Ein} = M_{Mot} - M_{V1} - M_{V2} - M_{PTO}^{Ein}$$

wherein a value of the third loss torque $M_{PTO}^{Ein}$ may be available or may be stored on a PTO control unit. The transmission efficiency value $\eta_T$ may depend upon different variables or parameters for different types of transmissions, with the result that different function sets may result for the transmission efficiency value. For a continuously variable transmission, in particular an IVT (infinitely variable transmission) transmission, the transmission efficiency value $\eta_T^{IVT}$ may be described as follows:

$$\eta_T = \eta_T^{IVT} = f(M_T^{Ein}, i_T, n_{Mot}, T_T)$$

with $n_{Mot}$=motor rotational speed and $T_T$=temperature of the transmission oil.

For a discrete or non-continuously variable transmission, by way of example a gearbox, the transmission efficiency value may be described as follows:

$$\eta_T = \eta_T^{DT} = f(M_T^{Ein}, G, n_{Mot}, T_T)$$

with G=gear.

The transmission efficiency value or the third loss torque may be an approximation function that is determined by polynomial regression, or may also be generated by a simulation method or measurements on a prototype. The transmission efficiency value or the third loss torque may be stored in the control unit or may be calculated by the control unit or may be available as a value table or characteristic diagram.

When an IVT transmission is used, the output torque may also be determined by the force transmission means such as the variator, a pressure sensor on the hydraulic variator, or a measurement of the inverter current by a current sensor on the electric variator. One advantage of this measure is that a change to the towing force, which results from the change of the transmission ratio of the transmission, is incorporated into the procedure for determining the output torque that is proportional to the towing force. Furthermore, the above-mentioned advantages are realized.

In one embodiment of the present disclosure, the control operation comprises the following steps: comparing the output torque with a reference torque and adjusting the working vehicle-working device combination or the part system if the output torque deviates from the reference torque. The output torque may be tailored to the reference torque, in particular in the event of a deviation of the output torque from the reference torque. It is possible therefore to adjust one of the parameters of the working vehicle-working device combination, the motor parameter, the motor loss parameter or the load parameter, or the part system, or the working vehicle-working device combination in such a manner that the output torque is tailored to the reference torque. If the output torque does not deviate from the reference torque, the control operation adjustment of the part system may be maintained.

The part system may in particular be an actuating unit, such as a hydraulic or electronic actuating unit, for adjusting the working device. In this case, the control operation also comprises the following steps of comparing the output torque with a reference torque or adjusting the actuating unit if the output torque deviates from the reference torque. In particular, the engagement of the working device with the ground or the position of the working device may be adjusted or maintained using the part system or the actuating unit, in particular a working depth or height of the working device may be adjusted or maintained. Where applicable, the control operation may also be monitored and regulated using the steps mentioned above. However, it is also possible that a separate specification from the comparison in accordance with one of the aforementioned steps of the method being fixedly provided and controlled or regulated. The control operation may be performed or adjusted using the control unit. The reference torque may be provided by the operator of the working vehicle-working device combination or may be provided in an automated manner by a standard value or in dependence upon the prevailing working location with knowledge of the ground conditions. The method disclosed here and also all the embodiments of the method offers the advantages that as a consequence the adjustment of the towing force on the working vehicle-working device combination, in particular by adjustments on the working vehicle or working device or part system, may be realized in a reliable, precise and technically simple manner. Consequently, only the deviation between the output torque and a desired value, in particular a reference torque, is advantageously used for the control operation and an absolute value of the towing force is not required. Furthermore, the control operation may be used so as to introduce or reinforce a control procedure or regulating procedure. This measure improves the accuracy and increases the regulating accuracy with which the working device may be adjusted by means of the part system or the actuating unit.

In one embodiment of the present disclosure, the motor parameter is the injected fuel quantity, the motor loss parameter is a motor rotational speed or the cooling temperature of the working vehicle-working device combination, in particular of the working vehicle or of the motor, or the load parameter is a pressure, a power, a current strength/voltage, a torque, a rotational speed, a speed, or a temperature of the load system. The load system or load systems may be a fan, a generator, or a pump of the working vehicle-working device combination, in particular of the working vehicle. The pump may be in particular a cooling pump or a hydraulic pump.

In particular, the motor rotational speed may be a first motor loss parameter or the cooling temperature of the motor may be a second motor loss parameter. In particular, the fan torque may be a first load parameter, the generator torque may be a second load parameter or the pump torque may be a third load parameter. Moreover, the motor torque $M_{Mot}$ may be a function of the motor parameter $b_{Mot1}$ in other words may be the injected fuel quantity:

$$M_{Mot} = f(b_{Mot1})$$

The motor parameter may be determined by a motor sensor, in particular an injection sensor.

In particular, the first loss torque may be based upon frictional losses, i.e., depend upon the motor rotational speed or the cooling temperature of the motor. The first loss torque may consequently be described as a function of the motor rotational speed or of the cooling temperature of the motor:

$$M_{V1} = f(n_{MOT}, T_{MOT})$$

In particular, it is possible using a first motor loss sensor to determine a motor rotational speed or using a second motor loss sensor to determine a cooling temperature of the motor, which in particular may be a speed sensor or a rotational speed sensor or a temperature sensor.

In particular, the second loss torque may be described in dependence upon the fan torque $M_{Vent}$ as the first load parameter or the generator torque $M_{Elektr}$ may be described as the second load parameter or the pump torque $M_{Pumpe}$ may be described as the third load parameter as follows:

$$M_{V2} = M_{Vent} + M_{Elektr} + M_{Pumpe}$$

The fan torque may be determined as a function of the fan speed, in particular of the fan rotational speed $n_{Vent}$, of the variator drive transmission $i_{Vent} = n_{Vent}/n_{Motor}$ and of the variator drive efficiency $\eta_{Vent} = f(n_{Mot}, n_{Vent})$ and also of the fan constant k:

$$M_{Vent} = \frac{k n_{Vent}^2}{i_{Vent}} \eta_{Vent}$$

In particular, the fan rotational speed may be determined by means of an electrical viscosity coupling as a load sensor.

The generator torque $M_{Elektr}$ may likewise be represented or determined as a function of the generator current strength $I_{Generator}$, in other words in dependence upon the generator current strength $I_{Generator}$:

$$M_{Elektr} = f(I_{Generator})$$

The pump torque of the cooling pump, which may be a positive displacement pump, may be described or determined by way of example as a function in dependence upon the rotational speed or temperature of the cooling pump:

$$M_{Pumpe} = f(n_{Pumpe}, T_{Pumpe})$$

The load parameter may be determined directly or indirectly by one or multiple load sensors.

In order to determine the above-mentioned parameters or variables or values, in particular of the fan rotational speed $n_{Vent}$, of the generator current strength $I_{Generator}$, of the rotational speed $n_{Pumpe}$ or temperature of the cooling pump $T_{Pumpe}$, a pressure sensor, power sensor, current sensor/voltage sensor, torque sensor, rotational speed sensor or temperature sensor may be used.

The above-described functions, in particular of the motor torque, the first loss torque, the second loss torque, the fan torque $M_{Vent}$, the generator torque $M_{Elektr}$, or the pump torque $M_{Pumpe}$, may be generated and stored by a simulation method or measurements taken from a prototype. This may be by, for example, recording and storing the values of the function, or may be estimated as an approximation function (cf., also above). The functions may likewise also be stored or used or determined as a characteristic diagram or as a value table, in particular on or in the control unit, or may be calculated by means of the control unit.

The present disclosure further relates to a system including a control device for a working vehicle-working device combination for implementing the above-described method. The system in accordance with the present disclosure comprises the above-described advantages of the method in accordance with the present disclosure.

In one embodiment of the present disclosure, the system comprises a control unit for implementing the method and a part system for adjusting the working vehicle-working device combination, in particular the working device of the working vehicle-working device combination.

The system may be operated or adjusted by means of the control unit in such a manner that a motor torque of a motor of the working vehicle-working device combination may be determined in dependence upon a motor parameter, and a first loss torque may be determined in dependence upon at least one motor loss parameter of the motor, or a second loss torque may be determined in dependence upon at least one load parameter of at least one load system of the working vehicle-working device combination, and an output torque of the working vehicle-working device combination may be determined with the aid of the motor torque and the first or second loss torque, and a control operation may be performed on the working vehicle-working device combination or on the part system by means of the control unit in dependence upon the output torque, in particular in dependence upon a value of the output torque.

In one embodiment of the present disclosure, the system comprises at least one sensor, wherein a sensor signal may be produced using the sensor by a measured motor parameter, a motor loss parameter, or a load parameter, in other words a sensor signal may be generated and the sensor signal may be ascertained and evaluated using the control unit. The working vehicle-working device combination, in particular the system, may comprise one or multiple sensors, in particular of the sensors described above in association with the method.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
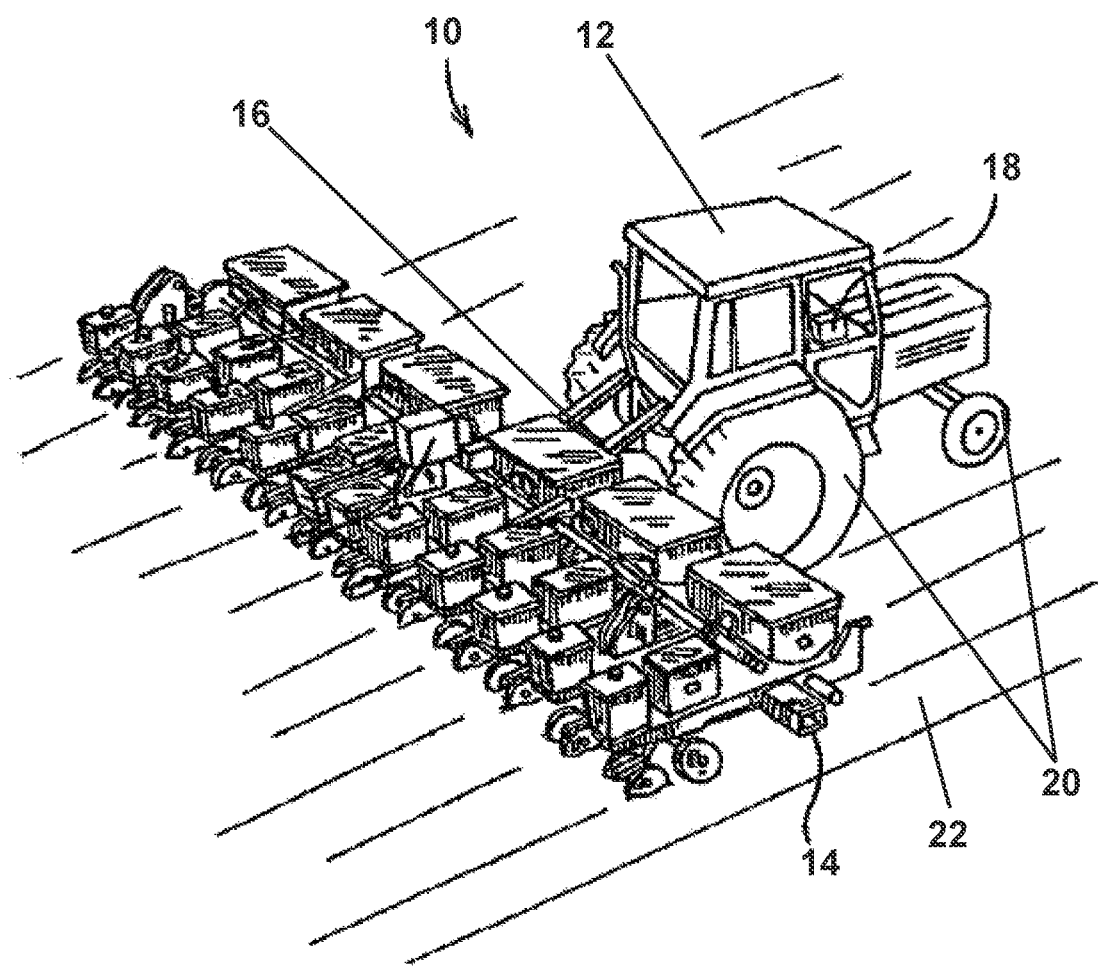
FIG. 1 illustrates a side view of a first embodiment of a working vehicle-working device combination in accordance with the present disclosure.

FIG. 1 illustrates schematically a side view of a first embodiment of a working vehicle-working device combination 10 in accordance with the present disclosure. The working vehicle-working device combination comprises a working vehicle 12, a working device 14 and a part system 16 that is embodied as an actuating unit.

The working vehicle 12 is an agricultural vehicle in the form of a tractor, wherein the fundamental construction of a tractor is assumed to be known to the person skilled in the art. A working vehicle 12 in the sense of the present disclosure may be any vehicle that may be used for construction work or for agricultural work such as, for example, a tractor, a telescopic handler or a construction machine.

The working vehicle 12 comprises a driver cabin 18 for receiving an operator, wherein an operating terminal for operating the tractor is arranged within the driver cabin 18. The tractor comprises multiple ground-engaging means 20, which are arranged on a front axle and a rear axle, in the form of air-filled wheels which are in engagement with a ground 22 in order to transmit driving forces. The ground-engaging means 20 are driven by a motor, which is embodied in the form of an internal combustion engine, and a transmission that cooperates with the internal combustion engine.

An output torque of the transmission is transmitted via a drive train, which is illustrated schematically, to the ground engaging means 20, wherein the illustrated tractor 12 is an all-wheel drive vehicle.

As illustrated, the part system 16 is used for the purpose of coupling the working device 14 to the working vehicle 12 or adjusting the working device with the result that the working vehicle 12 may pull the working device 14 into motion (for example, towing) or may perform a specific task. In the present embodiment, the working vehicle 12 provides the propulsion force in order to pull the working device 14 if the working device 14 is performing the task. In another embodiment, the working vehicle 12 may push the working device 14.

In FIG. 1, the working device 14 is a seed drill. However, the working device 14 may be any arbitrary working device 14 that is attached to the working vehicle 12. The part system 16 may also be used with any combination of working vehicle 12 and working device 14.

Figure 2:
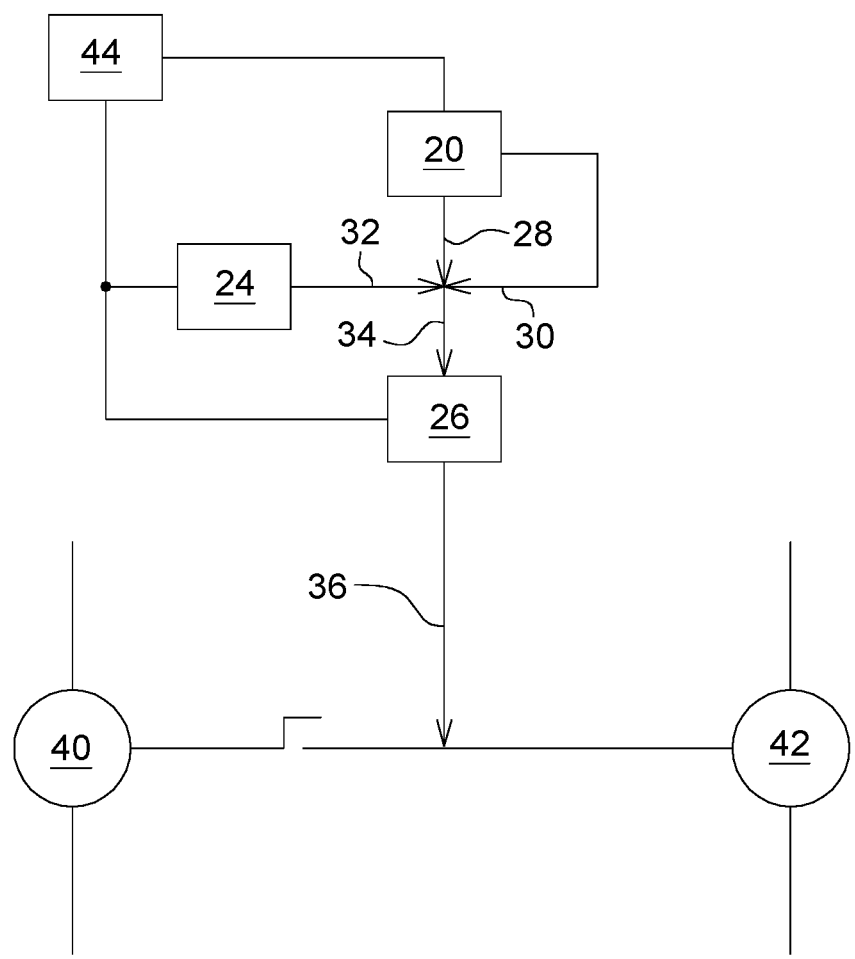
FIG. 2 illustrates a construction of the working vehicle-working device combination and the operating principle of the method in accordance with the present disclosure.

FIG. 2 illustrates schematically the construction of the working vehicle-working device combination 10, in particular in part the system, and the operating principle of the method in accordance with the present disclosure. The construction that is illustrated in FIG. 2 is a fundamental component of the working vehicle-working device combination 10 that is illustrated in FIG. 1 with the result that only the differences are mentioned below.

The working vehicle-working device combination 10, in particular the system for a working vehicle-working device combination, comprises a control unit for implementing the method and a part system 16 for adjusting the working vehicle-working device combination 10, in particular the working device 14. The control unit 44 may be embodied and configured in such a manner that the method may be implemented at least in part or entirely using the control unit 44. The control unit 44 is connected to the motor 20, the load system 24, and the transmission 26 so that the control unit may transmit signals and the motor, load system and transmission are adjustable or may be adjusted by the control unit 44. The working vehicle-working device combination 10, in particular the system, may be operated or may be adjusted by the control unit 44 in such a manner that:

- a motor torque 28 of a motor 20 of the working vehicle-working device combination 10 may be determined in dependence upon a motor parameter, and
- a first loss torque 30 may be determined in dependence upon at least one motor loss parameter of the motor 20, and
- a second loss torque 32 may be determined in dependence upon at least one load parameter of at least one load system 24 of the working vehicle-working device combination 10, and
- an output torque 36 of the working vehicle-working device combination 10 may be determined with the aid of the motor torque 28 and the first and second loss torque 30, 32, and
- a control operation may be performed on the working vehicle-working device combination 10 or the part system 16 by the control unit 44 in dependence upon the output torque.

The method for operating a working vehicle-working device combination 10 having a part system 16 for adjusting the working vehicle-working device combination 10 may be implemented as follows. In a first step (i) of the method, the motor torque 28 of a motor 20 of the working vehicle-working device combination 10 is determined or may be determined in dependence upon a motor parameter such as the injected fuel quantity. In a second step (ii), a first loss torque 30 is determined in dependence upon at least one motor loss parameter of the motor 20. It may be desirable that the first loss torque 30 may be determined as a function of the motor rotational speed or of the cooling temperature. In a third step (iii), a second loss torque 32 is determined or may be determined in dependence upon at least one load parameter of the at least one load system 24 of the working vehicle-working device combination 10. It may be desired that the load system 10 may be a fan, a generator or a pump, wherein the fan torque may be a first load parameter or the generator torque may be a second load parameter or a pump torque may be a third load parameter. The steps (i)-(iii) may be performed simultaneously or may in part chronologically overlap or may in part be performed consecutively.

A fourth step (iv) provides that an output torque 36 of the working vehicle-working device combination 10 is determined by the motor torque 28 and the first or second loss torque 30, 32. The output torque 36 is transmitted to the front and rear axles 40, 42. Furthermore, a transmission torque 34 is determined, in other words the torque that is supplied by the motor 20 to a transmission 26 of the working vehicle-working device combination 10, in that the first and second loss torque 30, 32 is subtracted from the motor torque 28. Furthermore, the transmission torque 34 is multiplied by a selected transmission ratio and divided by a transmission efficiency value whereby the output torque 36 is determined. Since the output torque 36 is proportional to the towing force, a control operation may be performed on the working vehicle-working device combination 10 or on the part system 16 in dependence upon the output torque 36. The control operation in this case comprises comparing the output torque 36 with a reference torque and adjusting the working vehicle-working device combination 10 or the part system 16 if the output torque 36 deviates from the reference torque. Reference is made to the above description in relation to the formulae and function with regard to the individual parameters and torques.

Consequently, it is advantageously rendered possible to adjust the output torque 36, or towing force, irrespective of the working device 14. Here, the output torque 36 may be adjusted by changes to the motor torque 28 or to the first or second loss torque 30, 32.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for operating a working vehicle-implement combination, the method comprising:
   determining a motor torque of a motor of a working vehicle based on an injected fuel quantity measured by an injection sensor;
   determining a first loss torque based on a motor rotational speed measured by a first speed sensor and motor temperature measured by a temperature sensor;
   determining a second loss torque based on a fan torque measured by a load sensor, a generator torque measured by a current or voltage sensor, and a pump torque measured by a second speed sensor;
   determining a transmission torque based on subtracting the first loss torque and the second loss torque from the motor torque;

determining an output torque of the working vehicle based on the transmission torque multiplied by a selected transmission ratio and divided by a transmission efficiency value;

comparing the output torque with a reference torque based on a working location including ground conditions; and adjusting the output torque by changing the second loss torque when the output torque is different from the reference torque.

2. A system for a working vehicle-implement combination, comprising:

a motor torque of a motor of a working vehicle based on an injected fuel quantity measured by an injection sensor;

a first loss torque based on a motor rotational speed measured by a first speed sensor and motor temperature measured by a temperature sensor;

a second loss torque based on a fan torque measured by a load sensor, a generator torque measured by a current or voltage sensor, and a pump torque measured by a second speed sensor;

a transmission torque based on subtracting the first loss torque and the second loss torque from the motor torque;

an output torque of the working vehicle based on the transmission torque multiplied by a selected transmission ratio and divided by a transmission efficiency value; and a processor comparing the output torque with a reference torque based on a working location including ground conditions, and adjusting the output torque by changing the second loss torque when the output torque is different from the reference torque.

* * * * *